(12) United States Patent
Yen et al.

(10) Patent No.: US 11,554,503 B2
(45) Date of Patent: Jan. 17, 2023

(54) SELF-PROPELLED GRIPPER

(71) Applicant: SYNCMOLD ENTERPRISE CORP., New Taipei (TW)

(72) Inventors: Ching-Hui Yen, New Taipei (TW); Chien-Cheng Yeh, New Taipei (TW); Yen-Chang Su, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 313 days.

(21) Appl. No.: 16/892,599

(22) Filed: Jun. 4, 2020

(65) Prior Publication Data

US 2021/0001496 A1      Jan. 7, 2021

Related U.S. Application Data

(60) Provisional application No. 62/870,969, filed on Jul. 5, 2019.

(30) Foreign Application Priority Data

Mar. 18, 2020   (TW) .................................. 109203104

(51) Int. Cl.

| | |
|---|---|
| *B25J 15/00* | (2006.01) |
| *B25J 9/10* | (2006.01) |
| *B25J 15/04* | (2006.01) |
| *B25J 15/08* | (2006.01) |
| *B25J 15/10* | (2006.01) |

(52) U.S. Cl.
CPC ........... *B25J 15/0028* (2013.01); *B25J 9/108* (2013.01); *B25J 15/045* (2013.01); *B25J 15/083* (2013.01); *B25J 15/10* (2013.01)

(58) Field of Classification Search
CPC ..... B25J 15/086; B25J 15/103; B25J 15/0028
See application file for complete search history.

(56) References Cited

U.S. PATENT DOCUMENTS

| 4,428,710 A | 1/1984 | Grisebach et al. |
| 2020/0238540 A1* | 7/2020 | Wang .................... B25J 15/086 |

FOREIGN PATENT DOCUMENTS

| CN | 106272507 A | * | 1/2017 | .......... B25J 15/0052 |
| CN | 106272507 A |   | 1/2017 | |

(Continued)

OTHER PUBLICATIONS

Extended European Search Report (eESR) for the European counterpart dated Dec. 3, 2020; pp. 1-10.

*Primary Examiner* — Gerald McClain
(74) *Attorney, Agent, or Firm* — Muncy, Geissler, Olds & Lowe, P.C.

(57) ABSTRACT

A self-propelled gripper is installed on a robotic arm. The robotic arm includes a body and a tip axis. The self-propelled gripper includes a housing, a rotation element, a moving element, and at least one claw body. The housing is fixed on the body. The rotation element is disposed in the housing and secured with the tip axis. The moving element is movably disposed in the housing and is connected to the rotation element. The moving element includes at least one slot. The claw body is pivoted on the housing and partially extends in the corresponding slot. When the rotation element rotates along with the tip axis, the rotation element drives the moving element to process a linear motion along a rotation central line so that the claw body pivotally rotates on the housing.

19 Claims, 21 Drawing Sheets

(56) References Cited

FOREIGN PATENT DOCUMENTS

| EP | 1927483 A1 | | 6/2008 | |
|----|------------|---|--------|---|
| JP | 2008080471 A | * | 4/2008 | |
| JP | 2009172735 A | * | 8/2009 | |
| JP | 2009202332 A | * | 9/2009 | |
| WO | WO-2016121646 A1 | * | 8/2016 | ............... A63F 9/30 |
| WO | WO2016121646 A1 | | 8/2016 | |

* cited by examiner

SELF-PROPELLED GRIPPER

CROSS REFERENCE TO RELATED APPLICATION

This application claims the benefit of U.S. Provisional Application Ser. No. 62/870,969 filed on Jul. 5, 2019, and the benefit of Taiwan Patent Application Ser. No. 109203104 filed on Mar. 18, 2020. The entirety of each Application is incorporated herein by reference.

BACKGROUND OF THE INVENTION

1. Field of the Invention

The present invention relates to a gripper, more particularly, the present invention relates to a gripper installed on a robotic arm without being installed with an xextra independent power supply.

2. Description of Related Art

A conventional gripper installed on the robotic arm is usually externally connected. The gripper comprises at least one claw body, and the power of stretching or retracting the claw body is not driven by the robotic arm. In detail, the conventional grippers, such as electric grippers and pneumatic grippers, need extra power sources to drive the at least one claw body to stretch or to retract. The electric grippers would be externally connected to a motor, whereas the pneumatic grippers would be externally connected to a gas pipe and an air bottle. In addition to the external power source, for controlling the at least one claw body to stretch or to retract, an independent signal source is also provided to transmit the control signals to the at least one claw body. However, the structure and the circuit arrangement of the robotic arm would be too complicated after the equipment which provides the external independent power sources and the signal source is installed on the robotic arm.

SUMMARY OF THE INVENTION

A principal object of the present invention is to provide a gripper that uses a robotic arm as the power source. The tip axis of the robotic arm is directly used as the power source. The gripper can be easily installed on the robotic arm for operation, and the gripper can operate without connecting to other pipes or circuits of other extra power sources. The process of installing the gripper on the robotic arm is simplified. In addition to the robotic arm, other signal sources are not required during operation. The gripper may stretch or retract merely by controlling the robotic arm.

To achieve the above objective, the present invention provides a self-propelled gripper, installed on a robotic arm. The robotic arm comprises a body and a tip axis. The tip axis includes a flange face and at least one locking hole. The locking hole is formed on the flange face. A rotation central line is defined by the flange face. The self-propelled gripper comprises a housing, a rotation element, a moving element, and at least one claw body. The housing is fixed on the body. The rotation element is disposed in the housing and includes a connecting surface. The rotation element is fixed to the flange face. The moving element is movably disposed in the housing and is connected to the rotation element. The moving element includes at least one slot. The claw body is pivoted on the housing and partially extends into the corresponding slot. When the rotation element rotates along with the tip axis, the rotation element drives the moving element to process a linear motion along the rotation central line so that the claw body pivotally rotates on the housing.

The housing further includes a first guiding structure. The moving element further includes a second guiding structure. The first guiding structure and the second guiding structure assemble with each other. When the rotation element rotates along with the flange face, the first guiding structure guides the moving element only process the linear motion along the rotation central line relative to the housing.

The rotation element further includes a first transmission structure. The moving element further includes a second transmission structure. The first transmission structure and the second transmission structure match with each other. When the rotation element rotates, the first transmission structure rotates relative to the second transmission structure and drives the second transmission structure. The first guiding structure and the second guiding structure cooperate with each other. The moving element moves adjacent to or away from the flange face along the rotation central line.

When the rotation element rotates in a first rotation direction, the moving element moves toward a first direction along the rotation central line. When the rotation element rotates in a second rotation direction, the moving element moves toward a second direction along the rotation central line. The first direction and the second direction are opposite to each other.

In one embodiment, the first guiding structure has a guiding rod extending along and coinciding with the rotation central line. The second guiding structure has a guiding hole extending along and coinciding with the rotation central line. Each of the guiding rod and the guiding hole has a non-circular cross-section corresponding to each other, and the moving element is constrained to move along the rotation central line.

The rotation element further includes an enclosing section. The first transmission structure is a set of internal threads formed on the enclosing section. The moving element further includes a protruding section. The second transmission structure is a set of external threads formed on the protruding section. The protruding section inserts in the enclosing section, and the set of internal threads matches with the set of external threads.

The moving element further includes a central through hole and a bearing. The central through hole and the guiding hole are intercommunicated. A cross-section of the guiding hole is smaller than a cross-section of the central through hole. The bearing is received in the central through hole and is sleeved to the guiding rod.

The moving element further includes a circlip. An inner surface of the protruding section is formed with a groove. The circlip is disposed in the central through hole and clips in the groove to position the bearing.

In another embodiment, the first guiding structure has at least one guiding rod parallel to the rotation central line. The second guiding structure has at least one guiding hole parallel to the rotation central line. The guiding rod matches with the guiding hole.

The rotation element further includes a shaft rod. The first transmission structure is a set of external threads formed on the shaft rod. The moving element further includes a central through hole. The second transmission structure is a set of internal threads formed in the central through hole. The shaft rod inserts in the central through hole, and the set of external threads matches with the set of internal threads.

The rotation element further includes a first disk body and at least one concave. The first disk body is formed with the connecting surface, which is connected to the flange face. The concave is formed on a periphery of the first disk body and corresponding to the locking hole.

As an alternative, the rotation element further includes a first transmission structure. The moving element further includes a second transmission structure. The first transmission structure and the second transmission structure match with each other and integrally form a ball screw mechanism. When the rotation element rotates, the first transmission structure rotates relative to the second transmission structure and drives the second transmission structure. The moving element moves adjacent to or away from the flange face along the rotation central line.

When the rotation element rotates along with the tip axis, the moving element process the linear motion between a first position and a second position along the rotation central line so that the claw body correspondingly switches between a retracted position and a stretched position.

The self-propelled gripper further comprises at least one first securing element. The rotation element includes at least one first securing hole. The first securing element penetrates through the first securing hole and is fixed to the tip axis so that the connecting surface of the rotation element is fixed to the flange face of the tip axis.

The claw body includes a protrusion. The protrusion has a curved surface. The slot has a recessed space and a slot wall. The protrusion of the claw body inserts in the recessed space and abuts against the slot wall.

The housing includes at least one through slot. The protrusion of the claw body passes through the through slot and inserts in the slot.

The claw body further includes a hinge element. The claw body is rotatably connected to the housing by the hinge element.

The housing includes at least one first through hole. The moving element includes at least one second through hole. When the flange face is located at an initial angle, the first through hole and the second through hole correspond to the first securing hole. The first securing element penetrates through the first securing hole and is secured in the locking hole of the tip axis.

The self-propelled gripper further comprises at least one second securing element. The housing is disposed on the body of the robotic arm by the second securing element.

In one embodiment, the housing further includes a main body and an adapter. The adapter is fixed on the body of the robotic arm. The main body is secured to the adapter.

The adapter has a plurality of clamping elements. The second securing element penetrates through the clamping elements so that the clamping elements are secured with each other and formed into a circular shape to match an outer contour of the body.

In another embodiment, the housing further includes at least one second securing hole. The second securing element penetrates through the second securing hole and secures the housing to the body of the robotic arm.

DETAILED DESCRIPTION OF THE PREFERRED EMBODIMENT

Figure 1:
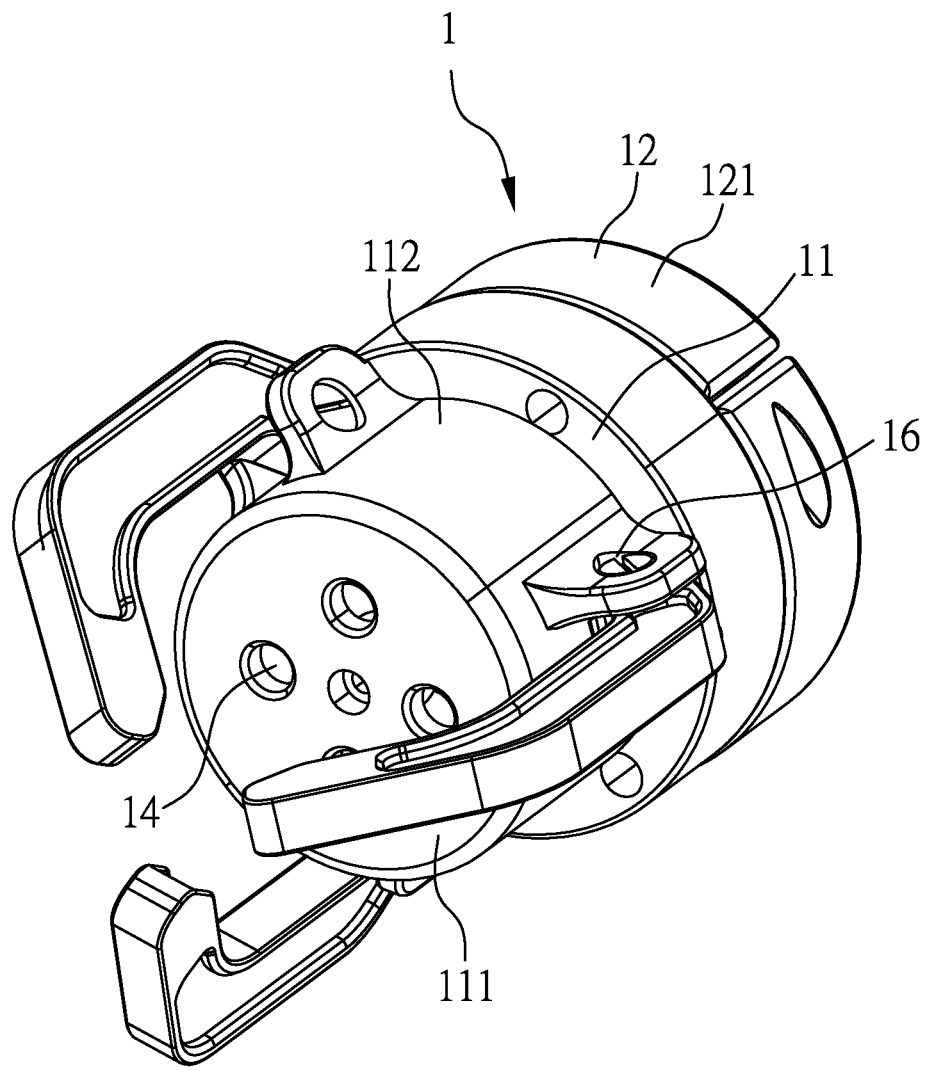
FIG. 1 is a perspective view showing the self-propelled gripper of the first embodiment of the present invention.
Figure 2:
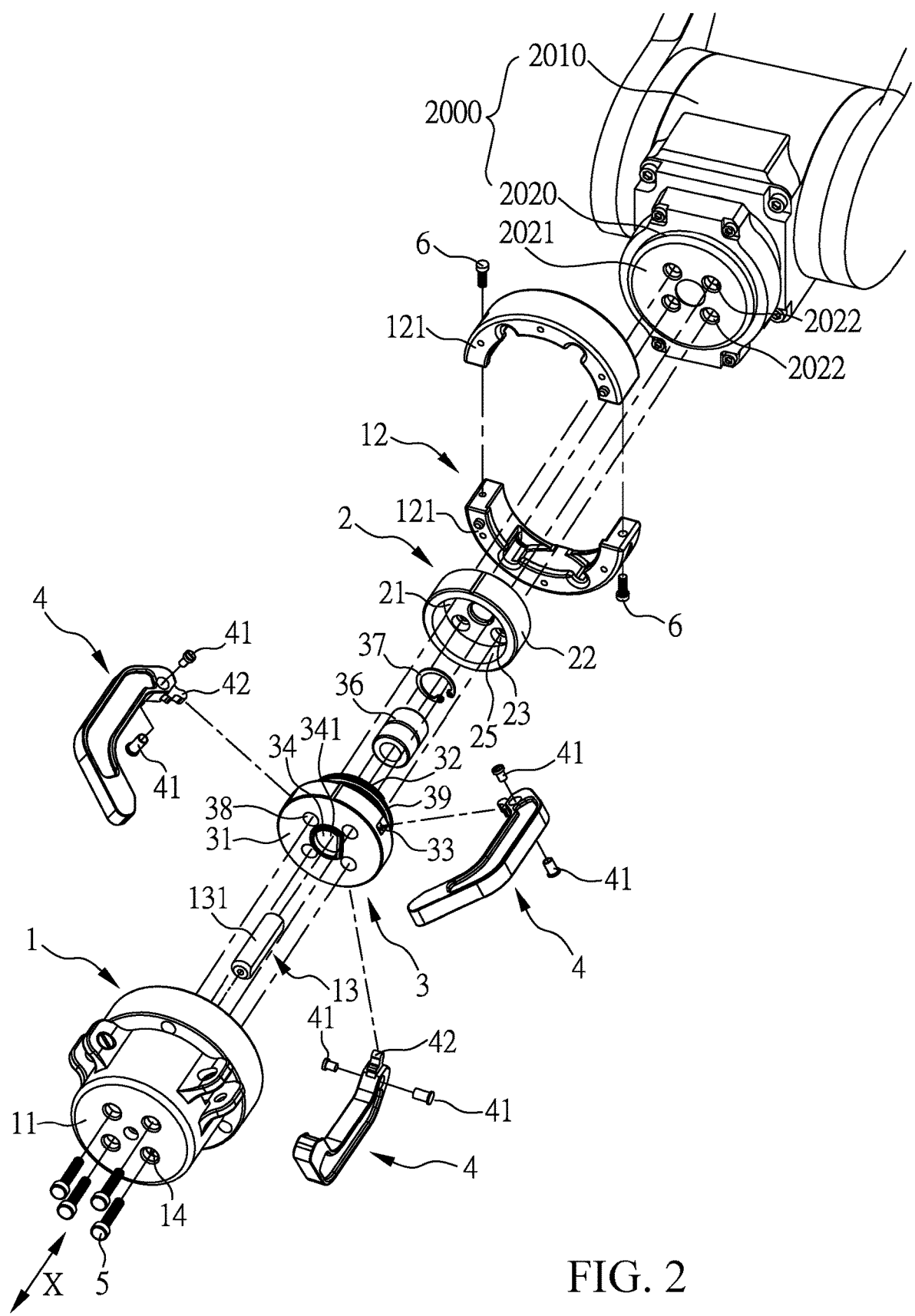
FIG. 2 is an exploded perspective view showing the self-propelled gripper of the first embodiment of the present invention.

Please refer to FIG. 1 and FIG. 2, which respectively show the perspective view and the exploded perspective view of a self-propelled gripper 1000 of the first embodiment of the present invention. The self-propelled gripper 1000 is adapted for gripping an object and comprises a housing 1, a rotation element 2, a moving element 3, at least one claw body 4, at least one first securing element 5, and at least one second securing element 6. The drawings of the present embodiment show three claw bodies 4, four first securing elements 5, and two second securing elements 6 for illustration, and the numbers of these elements are not limited herein.

Figure 3:
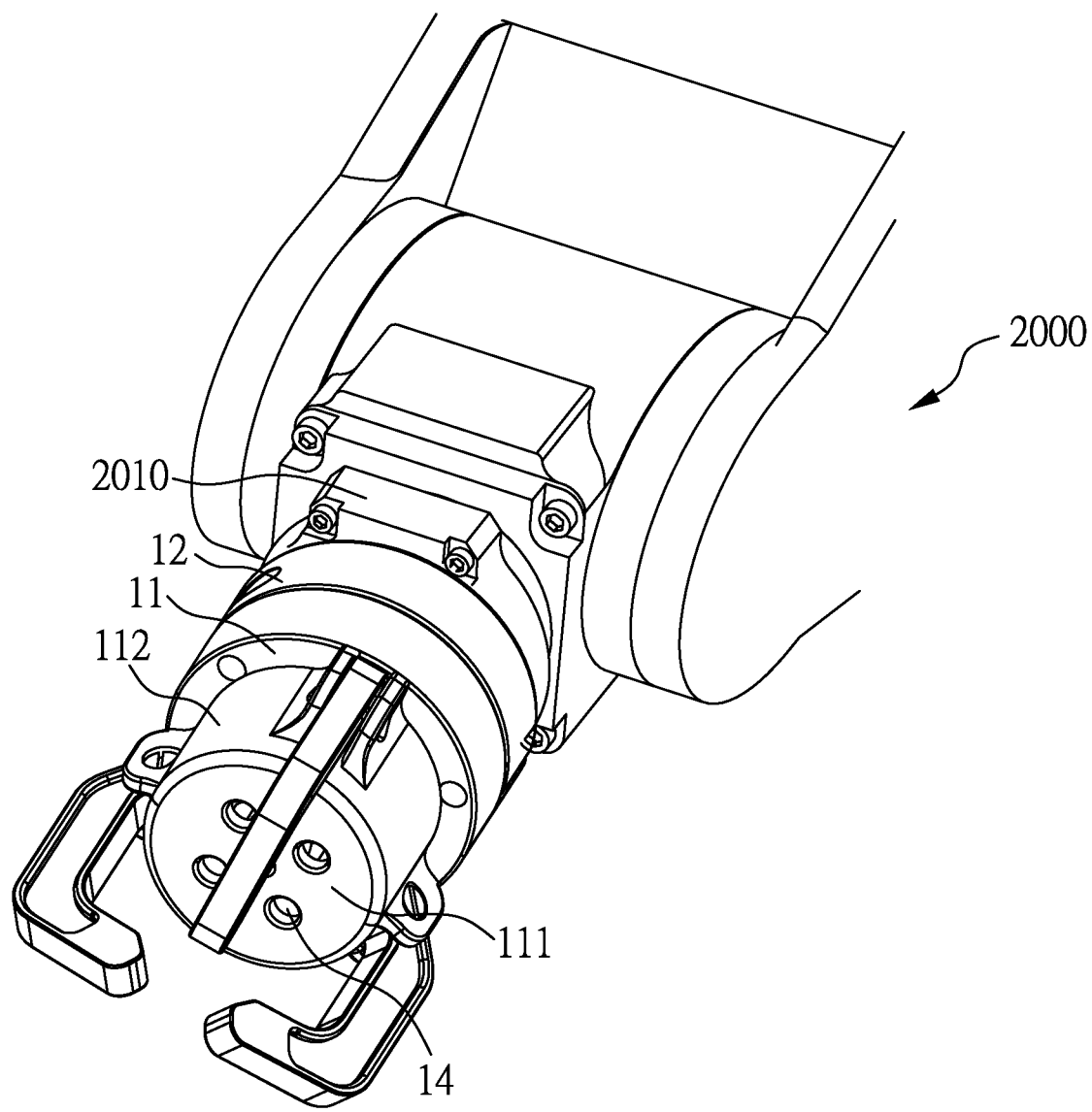
FIG. 3 is a perspective view showing the self-propelled gripper of the first embodiment of the present invention connecting to the robotic arm.
Figure 4:
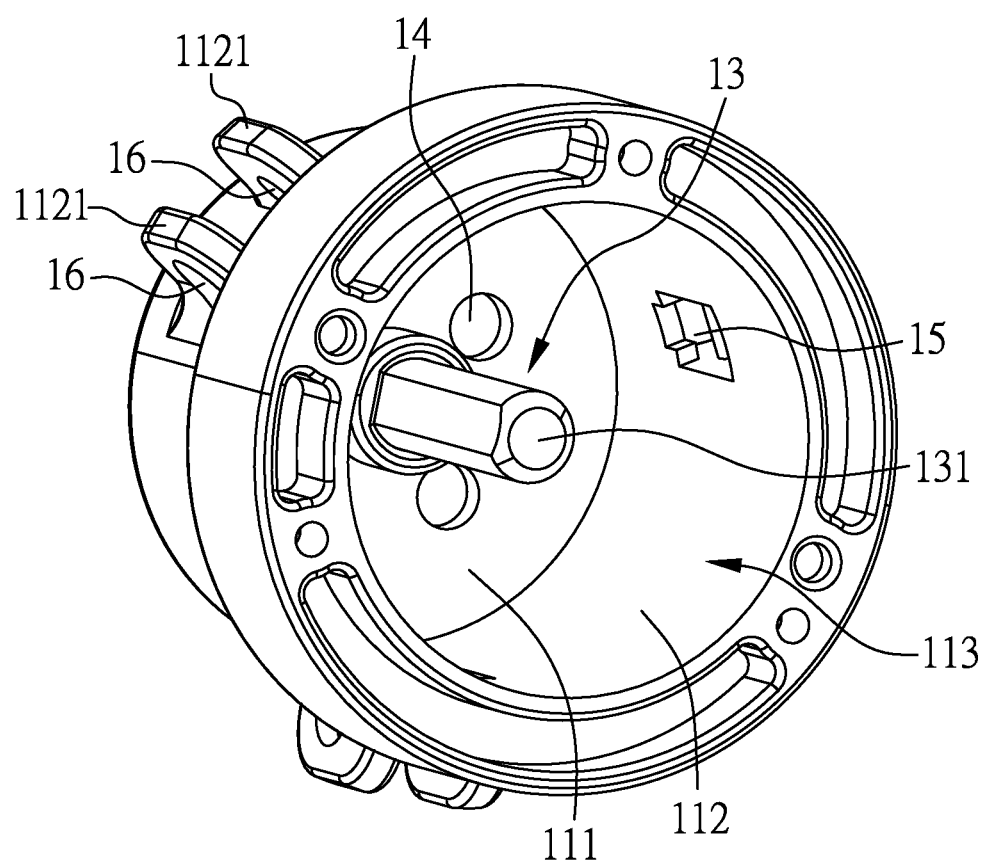
FIG. 4 is a perspective view showing the housing of the self-propelled gripper of the first embodiment of the present invention.

As shown in FIG. 2, FIG. 3 and FIG. 4, the self-propelled gripper 1000 is installed on a robotic arm 2000. The robotic arm 2000 comprises a body 2010 and a tip axis 2020. The tip axis 2020 includes a flange face 2021 and four locking holes 2022. The locking holes 2022 are formed on the flange face 2021. For the convenience of the following illustration, the flange face 2021 defines a rotation central line X.

The housing 1 is fixed on the body 2010 of the robotic arm 2000. The housing 1 includes a main body 11, an adapter 12, a first guiding structure 13, four first through holes 14, three through slots 15, and six pivot holes 16. The main body 11 is secured on the adapter 12 and has a top plate 111, a lateral wall 112 connecting to the top plate 111, and a receiving space 113. In the present embodiment, the lateral wall 112 and the top plate 111 integrally define the receiving space 113, and the lateral wall 112 has six wing plates 1121 extending outwardly. The wing plates 1121 are spaced in pairs, and two wing plates 1121 of the same pair are also spaced apart from each other. The receiving space 113 is adapted to receive the rotation element 2 and the moving element 3. The adapter 12 is fixed on the body 2010 of the robotic arm 2000 and has two clamping elements 121. The clamping elements 121 respectively match an outer contour 2011 of the body 2010, are formed into a circular shape to surround the periphery of the body 2010, and are secured by the second securing elements 6. Therefore, the clamping elements 121 firmly clamp the body 2010. The first guiding structure 13 has a guiding rod 131 extending along the rotation central line X. The guiding rod 131 is disposed in the center of the top plate 111 of the main body 11. The guiding rod 131 of the present embodiment is secured to the top plate 111 with screws. The first through holes 14 are formed on the top plate 111 of the main body 11. The through slots 15 are respectively formed on the lateral wall 112 of the main body 11 for the claw bodies 4 to pass through correspondingly. The pivot holes 16 are respectively formed on the wing plates 1121 of the main body 11 for the claw bodies 4 to be pivoted thereto.

Figure 5:
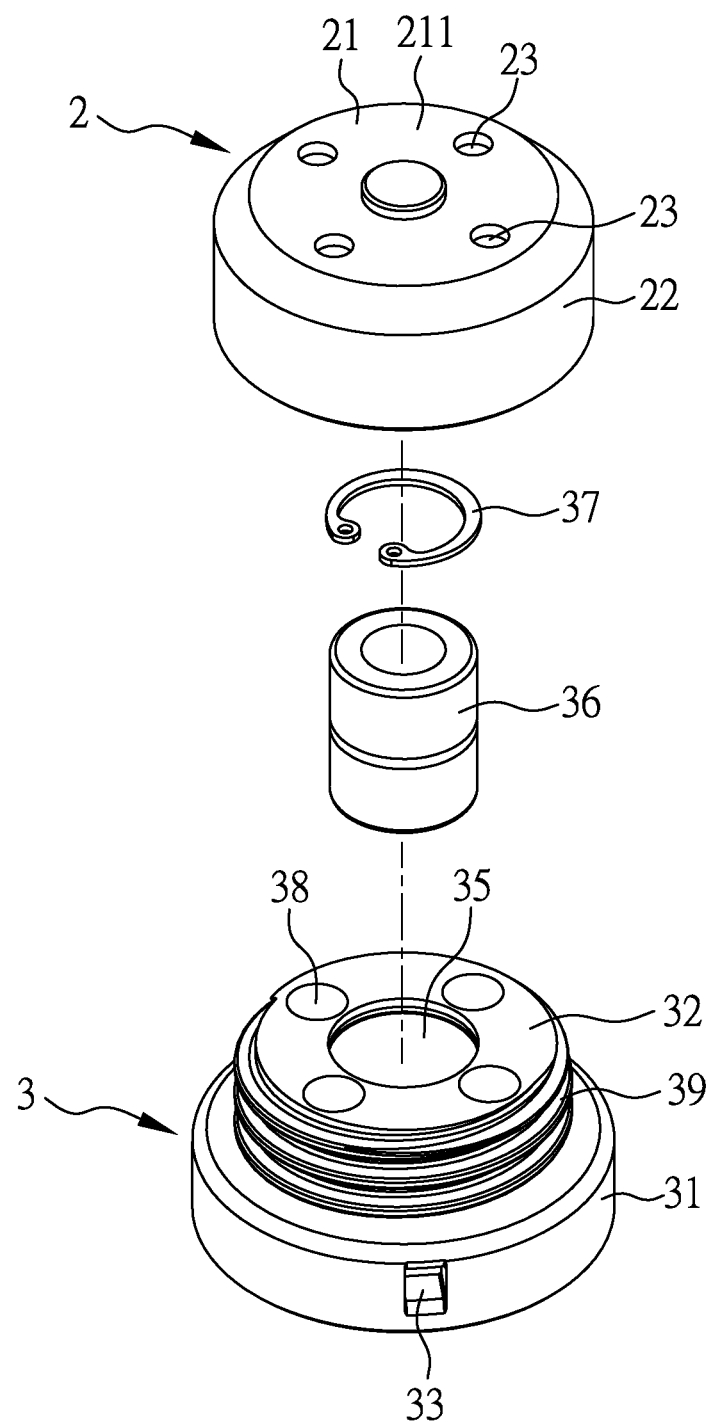
FIG. 5 is a partial perspective view showing the self-propelled gripper of the first embodiment of the present invention.

Please refer to FIG. 2 and FIG. 5, the rotation element 2 is disposed in the housing 1 and is in a concave disk shape. The rotation element 2 includes a first disk body 21, an enclosing section 22, four first securing holes 23, and a first transmission structure 25. Wherein, the first disk body 21 has a connecting surface 211. The connecting surface 211 is fixedly attached to the flange face 2021. The enclosing section 22 extends away from the body 2010 along the direction that is parallel to the rotation central line X from the edge of the first disk body 21. The first transmission structure 25 is formed on the enclosing section 22. In the present embodiment, the first transmission structure 25 is a set of internal threads for screwing with the moving element 3. Each of the first securing holes 23 is a through hole and is formed on the first disk body 21. Each of the first securing elements 5 penetrates through the corresponding first securing hole 23 and is secured on the tip axis 2020 so that the rotation element 2 is fixed to the tip axis 2020.

Figure 6:
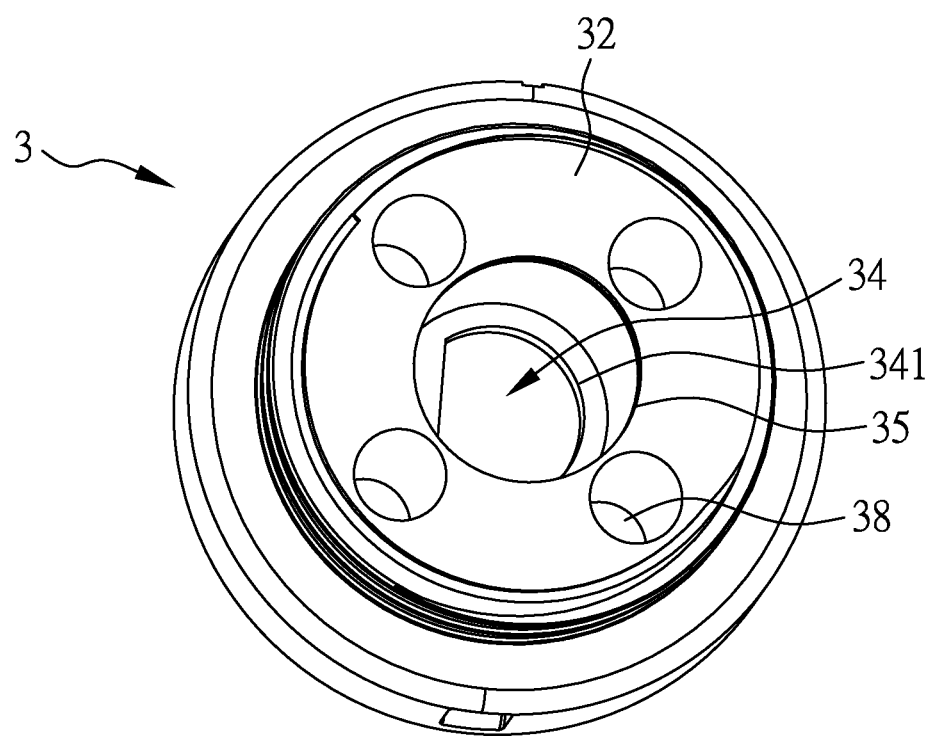
FIG. 6 is another partial perspective view showing the self-propelled gripper of the first embodiment of the present invention.

Please also refer to FIG. 6, the moving element 3 is slidably disposed in the housing 1 along the rotation central line X and screws with the rotation element 2. The moving element 3 has a second disk body 31, a protruding section 32, which extends along the direction that is parallel to the rotation central line X toward the body 2010, three slots 33, a second guiding structure 34, a central through hole 35, a bearing 36, a circlip 37, four second through holes 38, and a second transmission structure 39. The second transmission structure 39 is formed on the protruding section 32 to screw with the rotation element 2. In the present embodiment, the second transmission structure 39 is a set of external threads. The first transmission structure 25 and the second transmission structure 39 match with each other. In other words, the set of internal threads formed on the enclosing section 22 matches with the set of external threads formed on the protruding section 32. The slots 33 are respectively formed on the side of the second disk body 31 for the claw bodies 4 to insert in. Each of the slots 33 has a recessed space 331 and a slot wall 332 surrounding and defining the recessed space 331. The second guiding structure 34 has a guiding hole 341 extending along the rotation central line X. The guiding hole 341 is formed on the second disk body 31 and passes through the second disk body 31. The guiding rod 131 is located corresponding to the guiding hole 341 and penetrates through the guiding hole 341. Each of the guiding rod 131 and the guiding hole 341 has a non-circular cross-section corresponding to each other. Therefore, when the rotation element 2 rotates along with the flange face 2021 of the robotic arm 2000, the moving element 3 is constrained to move along the rotation central line X relative to the housing 1 instead of rotating relative to the housing 1. The central through hole 35 and the guiding hole 341 are intercommunicated for the bearing 36 to be disposed therein. The cross-section of the central through hole 35 is larger than a cross-section of the guiding hole 341. The bearing 36 is sleeved to the guiding rod 131 and is clamped between the second disk body 31 and the circlip 37. An inner surface, which is close to the rotation element 2, of the protruding section 32 is formed with a groove, and the circlip 37 is disposed in the central through hole 35 and clips in the groove to position the bearing 36. When the moving element 3 moves along the rotation central line X, the bearing 36 would not be released from the central through hole 35. The second through holes 38 pass through the second disk body 31 and the protruding section 32 along the rotation central line X and are corresponding to the first through holes 14 of the housing 1 respectively. The bearing 36 matches with the guiding rod 131, and the bearing 36 is a ball bearing. Therefore, the moving element 3 smoothly moves relative to the housing 1.

Figure 7:
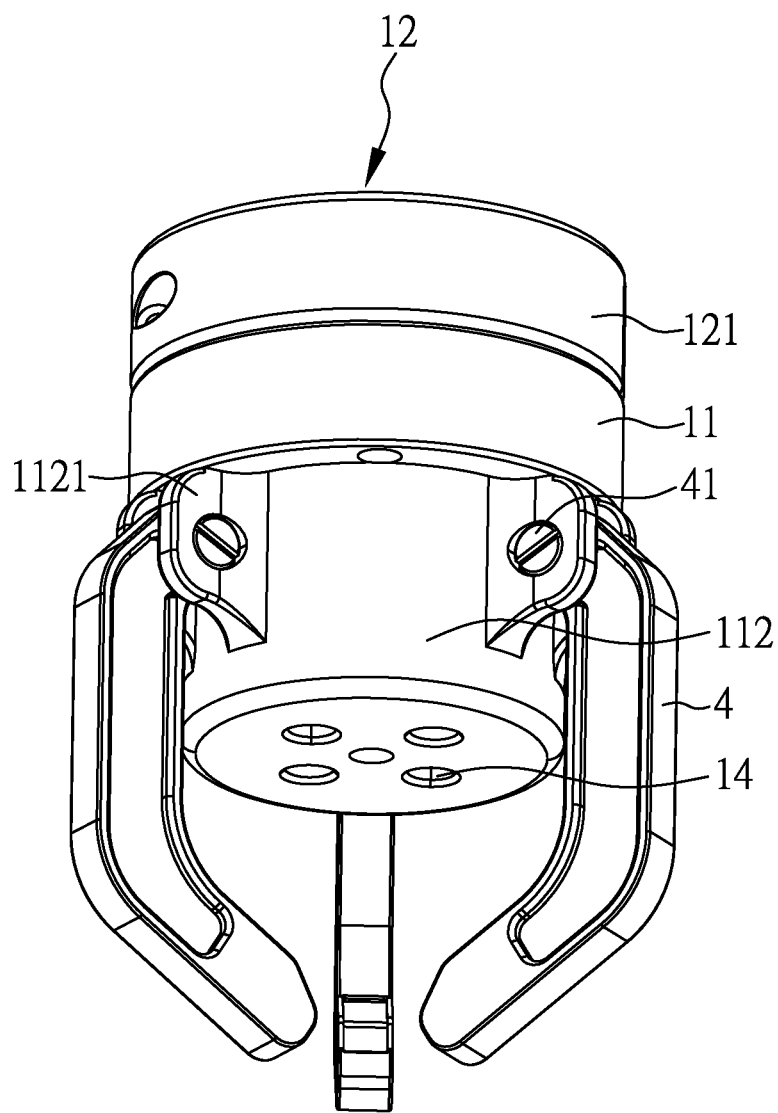
FIG. 7 is another perspective view showing the self-propelled gripper of the first embodiment of the present invention.
Figure 8:
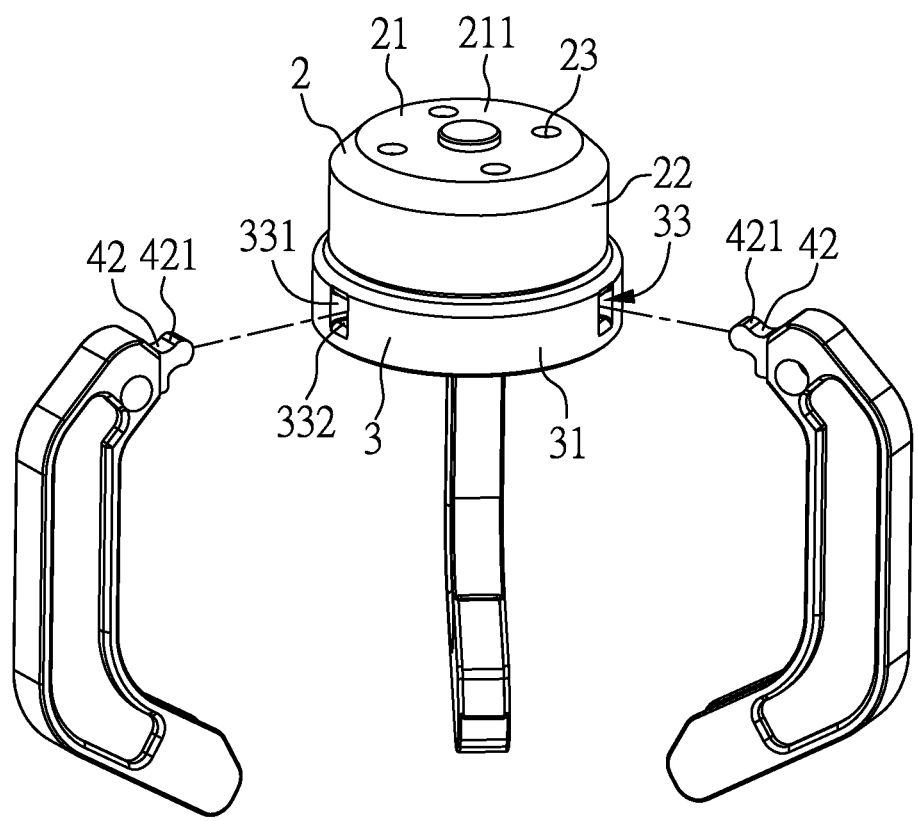
FIG. 8 is another partial perspective view showing the self-propelled gripper of the first embodiment of the present invention.

As shown in FIG. 7 and FIG. 8, each of the claw bodies 4 is pivoted on the corresponding pair of wing plates 1121 of the housing 1 and partially passes through the corresponding through slot 15 and inserts in the corresponding slot 33. Please also refer to FIG. 2, each of the claw bodies 4 has a hinge element 41 and a protrusion 42. Each of the hinge elements 41 penetrates through the corresponding pivot hole 16. Each of the protrusions 42 extends into and partially abuts against the corresponding slot wall 332 of the corresponding slot 33. Therefore, the claw bodies 4, being driven by the moving element 3, pivotally rotate relative to the housing 1.

Figure 9:
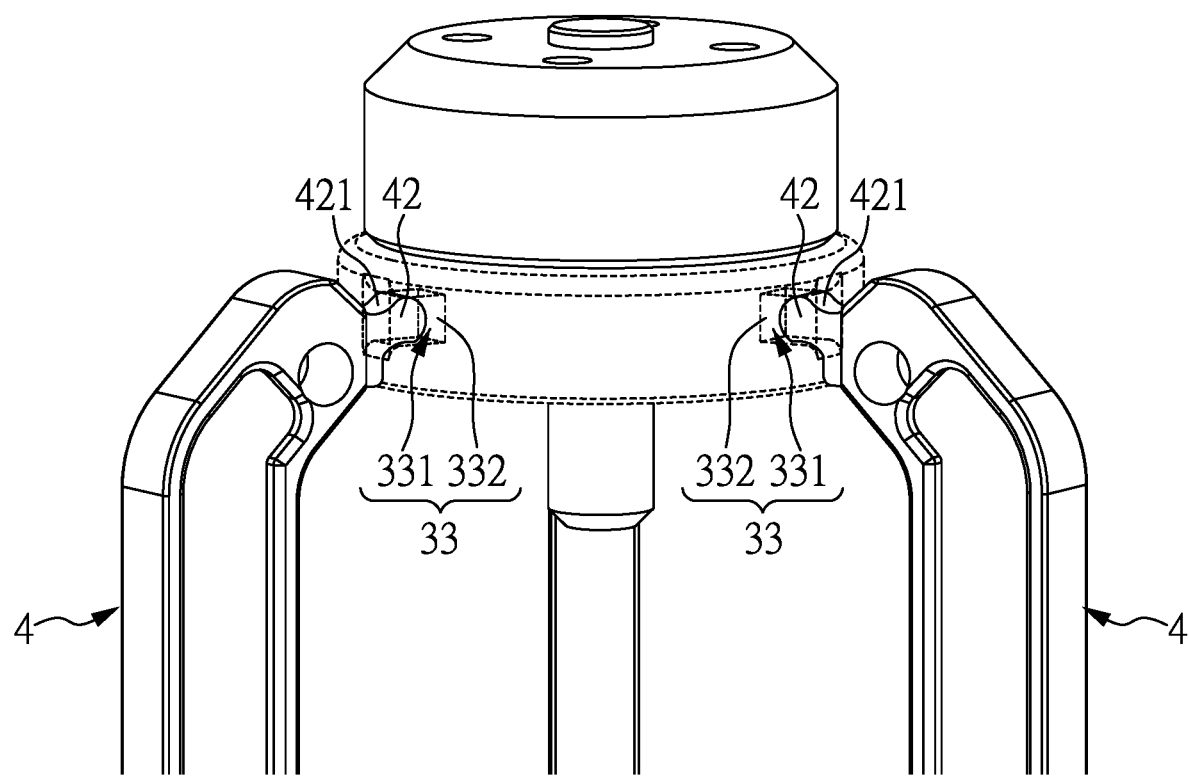
FIG. 9 is a partial perspective view showing the self-propelled gripper of the first embodiment of the present invention at a retracted position.
Figure 10:
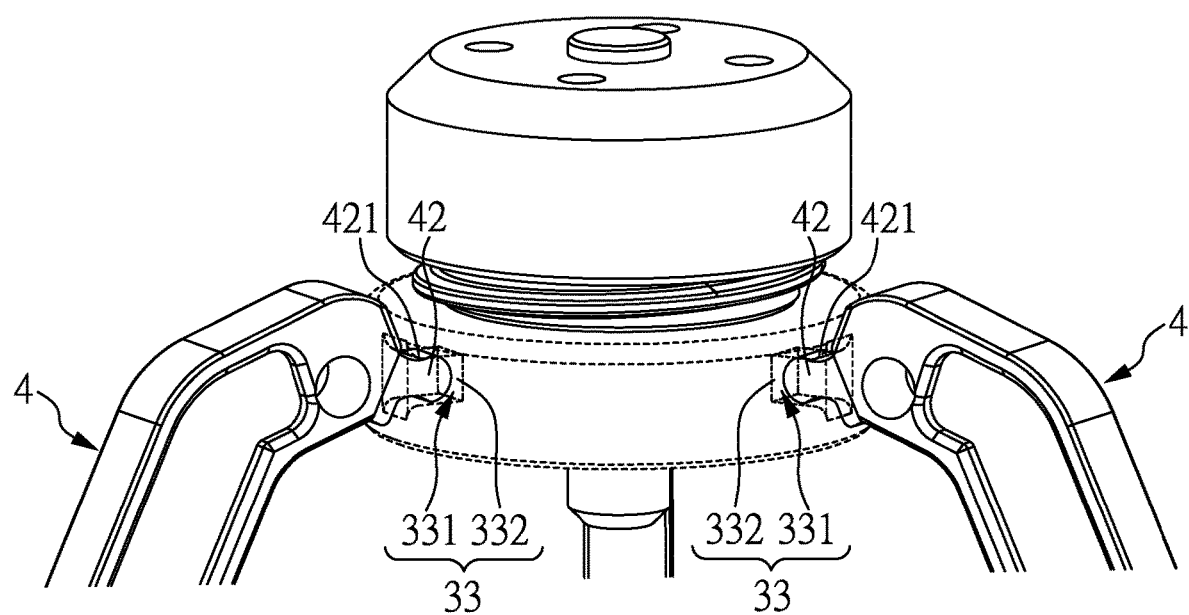
FIG. 10 is a partial perspective view showing the self-propelled gripper of the first embodiment of the present invention at a stretched position.

In detail, each of the protrusions 42 is a long and thin projection. Each of the slots 33 is a hollow, which is slightly larger than the corresponding protrusion 42, for receiving the corresponding protrusion 42. Please refer to FIG. 9 and FIG. 10, each of the protrusions 42 may rotate in the corresponding recessed space 331 of the corresponding slot 33 and abuts against the corresponding slot wall 332 with a curved surface 421 when the moving element 3 moves along the rotation central line X. Therefore, the claw bodies 4 may stay still when the moving element 3 is stopped at any position, and may smoothly rotate relative to the housing 1 when the moving element 3 moves.

The operation of the rotation element 2, the moving element 3, and the claw bodies 4 is described as follows. When the tip axis 2020 rotates, the connecting surface 211 of the rotation element 2 is attached to the flange face 2021 so that the rotation element 2 rotates along with the tip axis 2020 along the rotation central line X. Meanwhile, the first transmission structure 25, i.e. the set of internal threads, rotates relative to the second transmission structure 39, i.e. the set of external threads, and drives the second transmission structure 39. Additionally, the first guiding structure 13 cooperates with the second guiding structure 34. Therefore, the moving element 3 is constrained to process the linear motion relative to the housing 1 along the rotation central line X instead of processing the rotation motion. More specifically, through the correspondingly non-circular cross-sections of the guiding rod 131 and the guiding hole 341, the moving element 3 is constrained and does not rotate when the rotation element 2 rotates along with the tip axis 2020. Comparing the screwing, the moving element 3 moves along the rotation central line X instead of rotating. The claw bodies 4 extend into the slots 33 of the moving element 3 respectively. The claw bodies 4 would pivotally rotate on the housing 1 and stretch or retract when the moving element 3 moves forward or backward.

Figure 11:
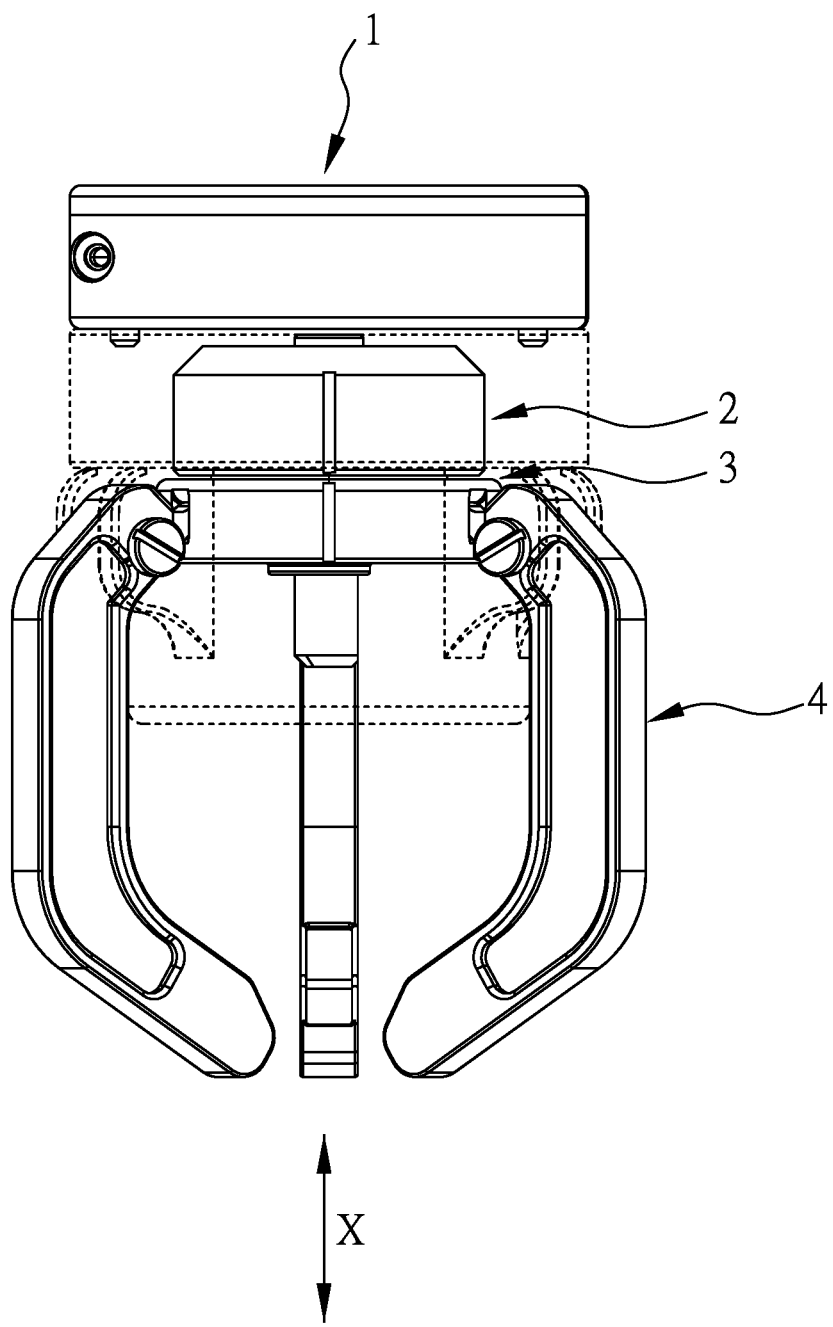
FIG. 11 is a perspective view showing the self-propelled gripper of the first embodiment of the present invention at the retracted position.
Figure 12:
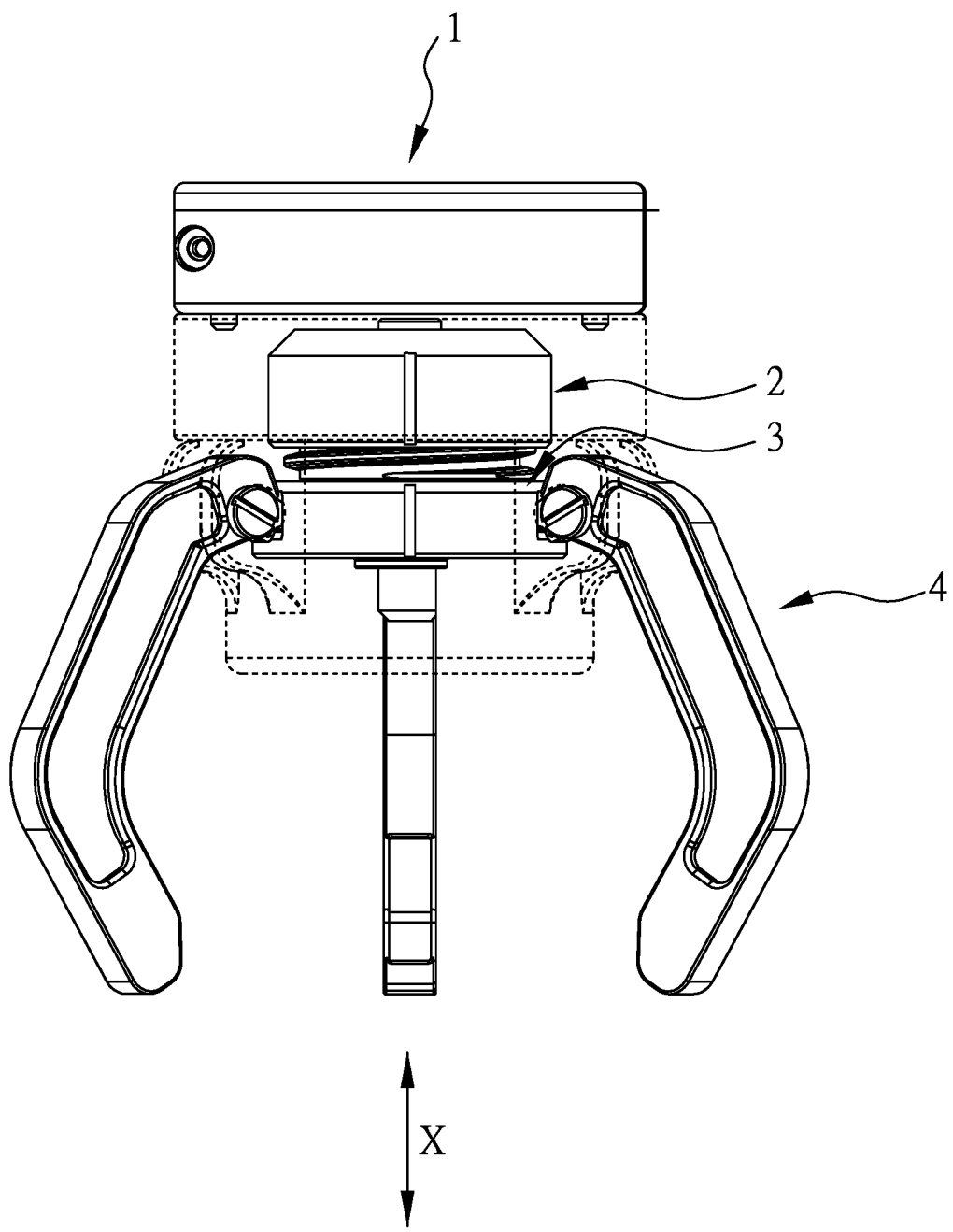
FIG. 12 is a perspective view showing the self-propelled gripper of the first embodiment of the present invention at the stretched position.

In other words, the guiding structure 13 and the second guiding structure 34 transform the rotation motion of the flange face 2021 to the linear motion of the moving element 3 when the rotation element 2 rotates along with the tip axis 2020. The moving element 3 moves on the guiding rod 131 between a first position and a second position along the rotation central line X, and the claw bodies 4 would correspondingly switch between a retracted position and a stretched position. Please refer to FIG. 9 and FIG. 11, when the moving element 3 is located at the first position, which is a relatively high position in the drawings, the claw bodies 4 are at the retracted position. Please refer to FIG. 10 and FIG. 12, when the moving element 3 moves to the second position, which is a relatively low position in the drawings, the claw bodies 4 are at the stretched position. By controlling the claw bodies 4 to switch between the retracted position and the stretched position, the self-propelled gripper 1000 is able to grip the object.

More explicitly, when the rotation element 2 rotates in a first rotation direction, the moving element 3 moves toward a first direction along the rotation central line X, which means moving toward the second position. When the rotation element 2 rotates in a second rotation direction, the moving element 3 moves toward a second direction along the rotation central line X, which means moving toward the first position. The first direction and the second direction are opposite to each other and overlap the rotation central line X.

As shown in FIG. 2, when installing the self-propelled gripper 1000 of the present invention on the robotic arm 2000, the flange face 2021 can be adjusted to an initial angle. Thereby, the first through holes 14, the second through holes 38, the first securing holes 23, and the locking holes 2022 are corresponding to each other. The corresponding first through holes 14, the corresponding second through holes 38, the corresponding first securing holes 23, and the corresponding locking holes 2022 are arranged into lines which are parallel to the rotation central line X. Each of the first securing elements 5 sequentially passes the corresponding first through hole 14, the corresponding through hole 38, and the corresponding first securing hole 23, and then is secured to the tip axis 2020. The operator may directly install or disassemble the self-propelled gripper 1000, and the assembly is facilitated.

It should be noted that the number of the first through holes 14, the number of the second through holes 38, the number of the first securing holes 23, and the number of the locking holes 2022 are all four. In other embodiments, the numbers are not limited to four, and the numbers are not necessarily the same as long as the elements are located at the corresponding positions.

The tip axis 2020 of the robotic arm 2000 is a self-rotated axis. The robotic arm 2020 comprises N controllable axes, and N is a positive integer larger than 1. When the robotic arm 2000 is assembled with the self-propelled gripper 1000, the body 2010, which is a part of the robotic arm 2000 other than the tip axis 2020, is adapted to connect to the housing 1, the tip axis 2020 is adapted to connect to the rotation element 2, and the rotation of the tip axis 2020 is used to control the claw bodies 4 to stretch or retract. There is one degree of freedom less for controlling the movement of the front end of the robotic arm 2000, and the robotic arm 2000 has N−1 degrees of freedom.

Comparing to the body 2010 of the robotic arm 2000, the housing 1 is directly fixed to the body 2010 and thus it is a stationary element. When the tip axis 2020 of the robotic arm 2000 rotates, the rotation element 2 in the housing 1 also rotates synchronously. The moving element 3 is driven to process the linear motion, and the claw bodies 4 are driven to stretch or retract. Comparing to the housing 1, the rotation element 2, the moving element 3, and the claw bodies 4 are moving elements.

Figure 13:
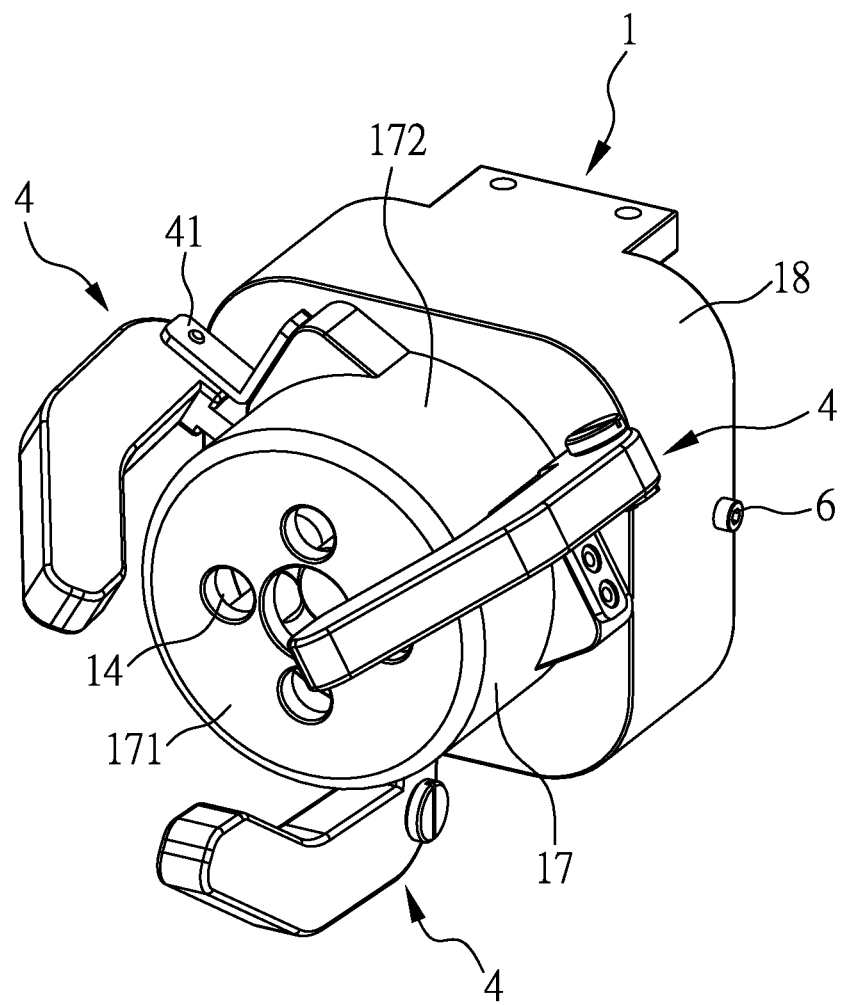
FIG. 13 is a perspective view showing the self-propelled gripper of the second embodiment of the present invention.
Figure 14:
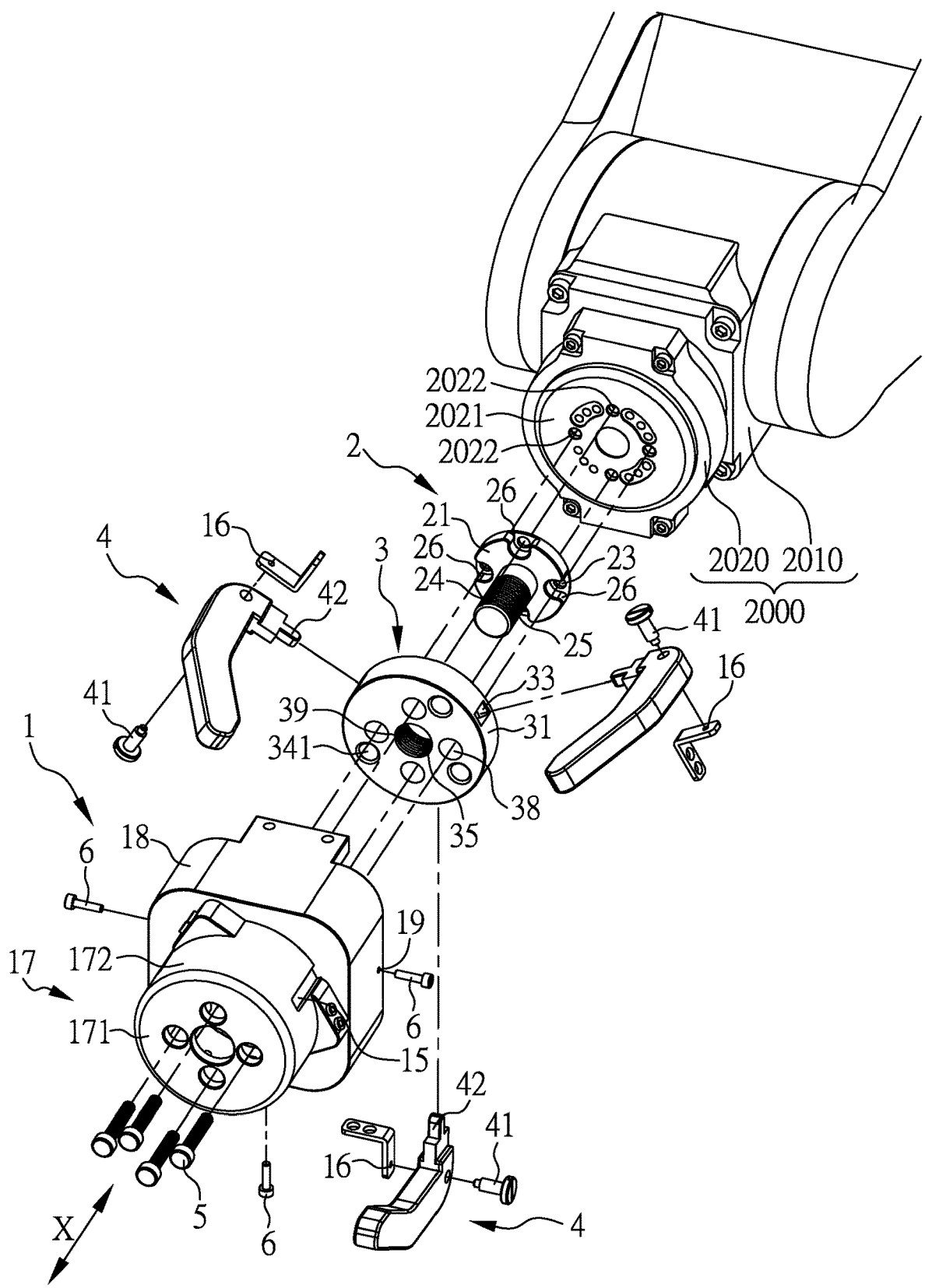
FIG. 14 is an exploded perspective view showing the self-propelled gripper of the second embodiment of the present invention.
Figure 15:
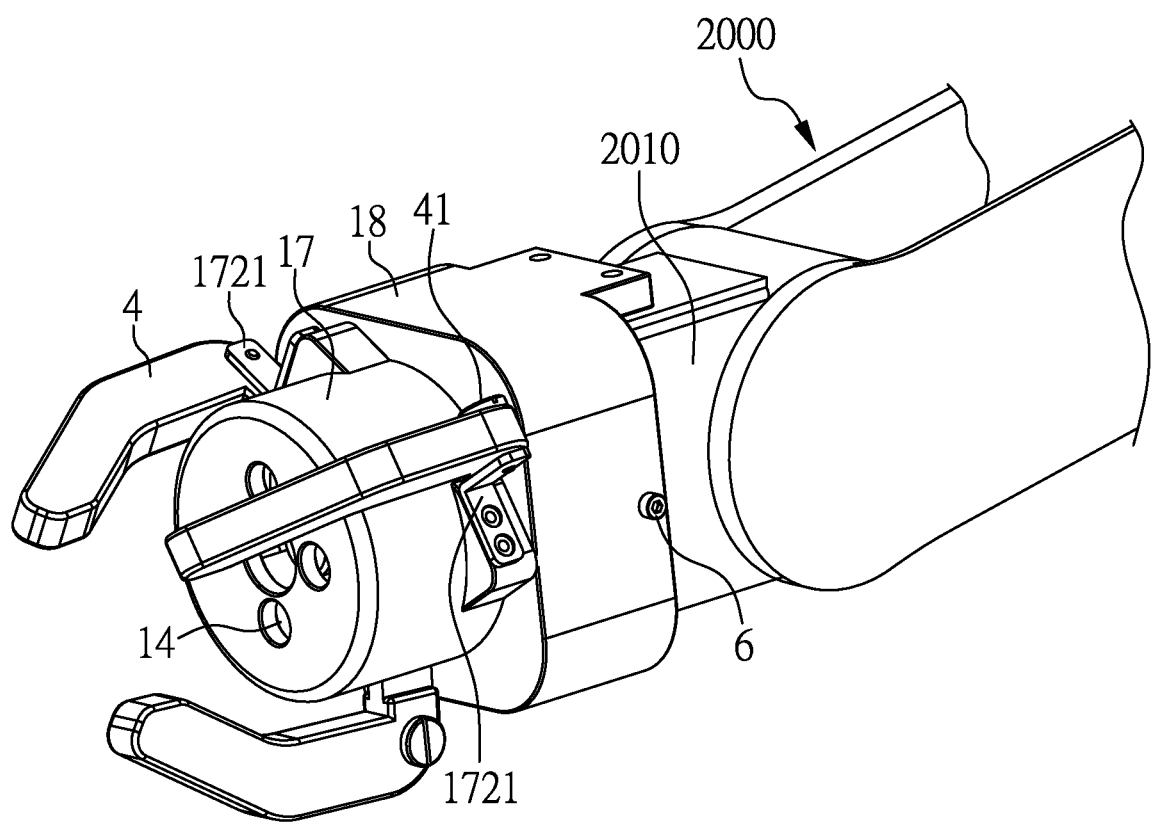
FIG. 15 is a perspective view showing the self-propelled gripper of the second embodiment of the present invention connecting to the robotic arm.

Please refer to FIG. 13, FIG. 14, and FIG. 15, which respectively show the perspective view and the exploded perspective view of a self-propelled gripper 1000 of the second embodiment of the present invention and the perspective view of the self-propelled gripper 1000 of the second embodiment of the present invention connecting to the robotic arm 2000. The operation principle of the self-propelled gripper 1000 of the second embodiment is roughly the same as that of the first embodiment. The difference between the two embodiments is described as follows.

Figure 16:
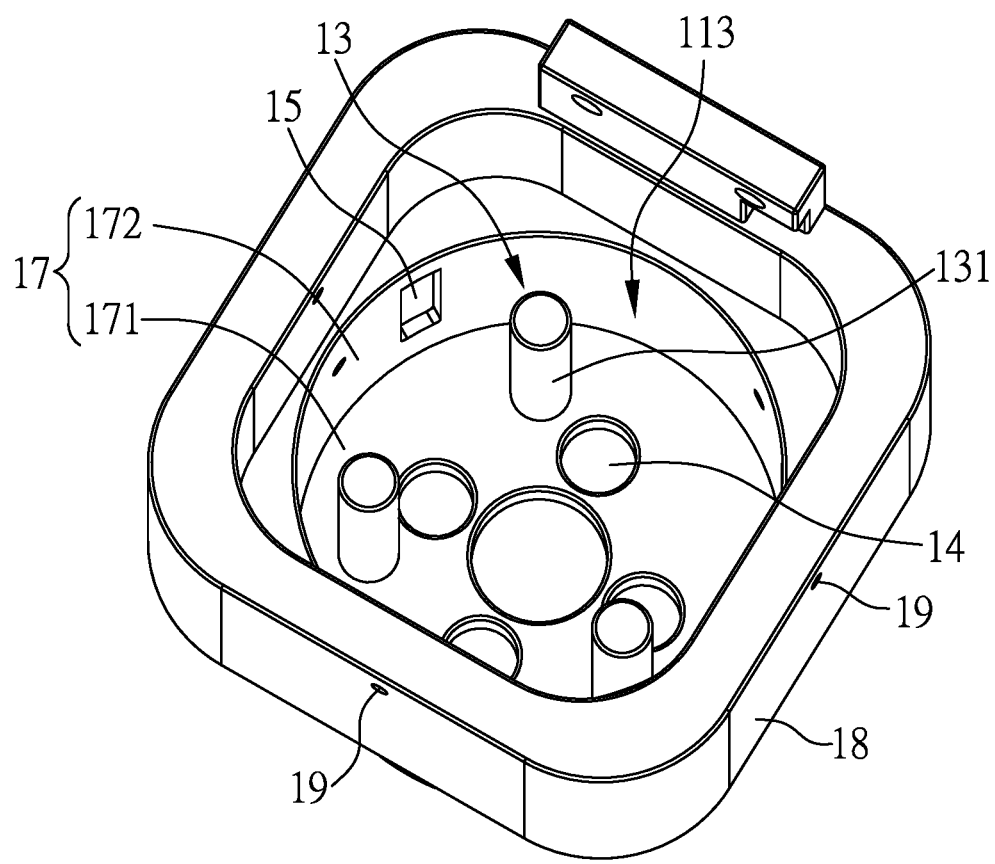
FIG. 16 is a perspective view showing the housing of the self-propelled gripper of the second embodiment of the present invention.

The housing 1 of the present embodiment is first illustrated. As shown in FIG. 14 and FIG. 16, the housing 1 of the present embodiment is integrated and can be distinguished into a front housing body 17, which is cylindrical, and a rear housing body 18, which is a rectangular column, according to the shape. The housing 1 includes two second securing holes 19. The receiving space 113 is defined with the front housing body 17 and the rear housing body 18, and the second securing holes 19 are formed on the rear housing body 18. The front housing body 17 has a top plate 171 and a lateral wall 172. In the present embodiment, the lateral wall 172 surrounds into a circular shape and has three wing plates 1721 extending outwardly. Four first through holes 14 are formed on the top plate 171 of the front housing body 17, and three through slots 15 are formed on the lateral wall 172.

It should be noted that the connecting manner between the housing 1 and the robotic arm 2000 of the present embodiment is different from the first embodiment. The second securing elements 6 respectively penetrate through the second securing holes 19 and are secured to the body 2010 of the robotic arm 2000. Thereby, the housing 1 is fixedly connected to the body 2010.

Figure 17:
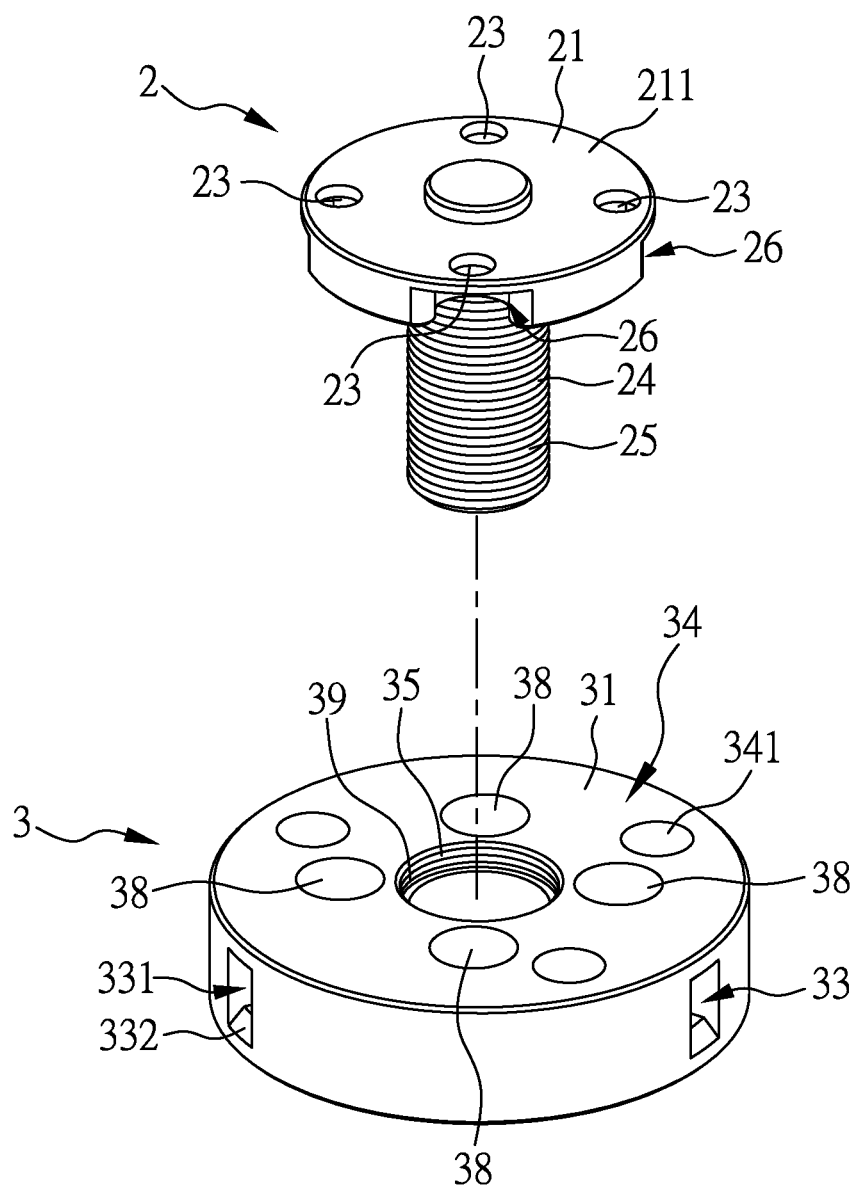
FIG. 17 is a partial perspective view showing the self-propelled gripper of the second embodiment of the present invention.

In the present embodiment, the first guiding structure 13 includes three guiding rods 131. The guiding rods 131 are parallel to the rotation central line X and are respectively corresponding to the three guiding holes 341 of the second guiding structure 34 of the moving element 3 as shown in FIG. 17. That is, the guiding holes 341 are also respectively parallel to the rotation central line X and match with the guiding rods 131. Therefore, the moving element 3 does not rotate relative to the housing 1.

FIG. 17 shows the perspective view of the rotation element 2 and the moving element 3 of the second embodiment of the present invention. The rotation element 2 of the present embodiment omits the enclosing section 22 and has a shaft rod 24 and four concaves 26. The first transmission structure 25 of the present embodiment is a set of external threads, which are formed on the shaft rod 24. The shaft rod 24 is connected to the central position of the first disk body 21 to screw the moving element 3. The concaves 26 are formed on a periphery of the first disk body 21 and corresponding to the locking holes 2022.

In the present embodiment, the moving element 3 is in a disk shape. The guiding holes 341 and the central through hole 35 are not intercommunicated and respectively pass the second disk body 31. The guiding holes 341 are respectively formed at the positions corresponding to the guiding rods 131. The second transmission structure 39 of the moving element 3 is a set of internal threads and formed in the central through hole 35. The first transmission structure 25 matches with the second transmission structure 39; that is, the set of external threads matches with the set of internal threads. The shaft rod 24 penetrates through the central through hole 35. When the rotation element 2 rotates, the moving element 3 is driven to move along the rotation central line X because the rotation element 2 is connected to the moving element 3.

Figure 18:
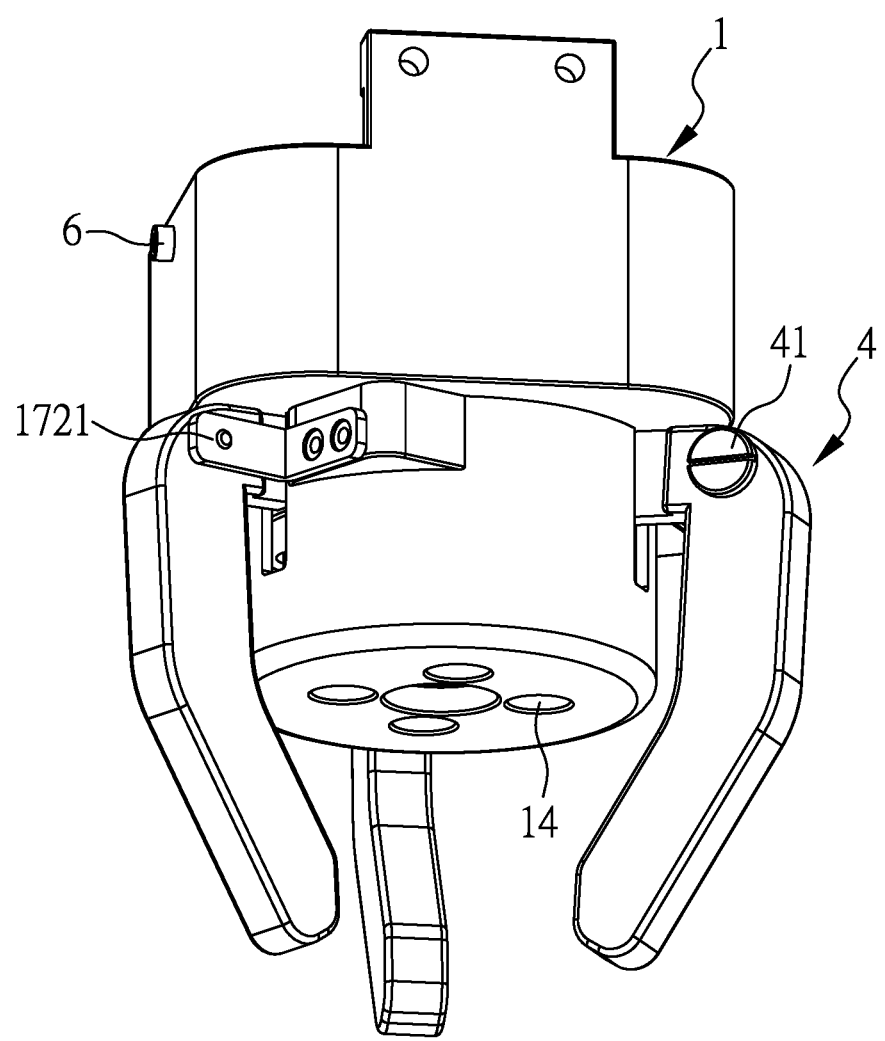
FIG. 18 is another perspective view showing the self-propelled gripper of the second embodiment of the present invention.
Figure 19:
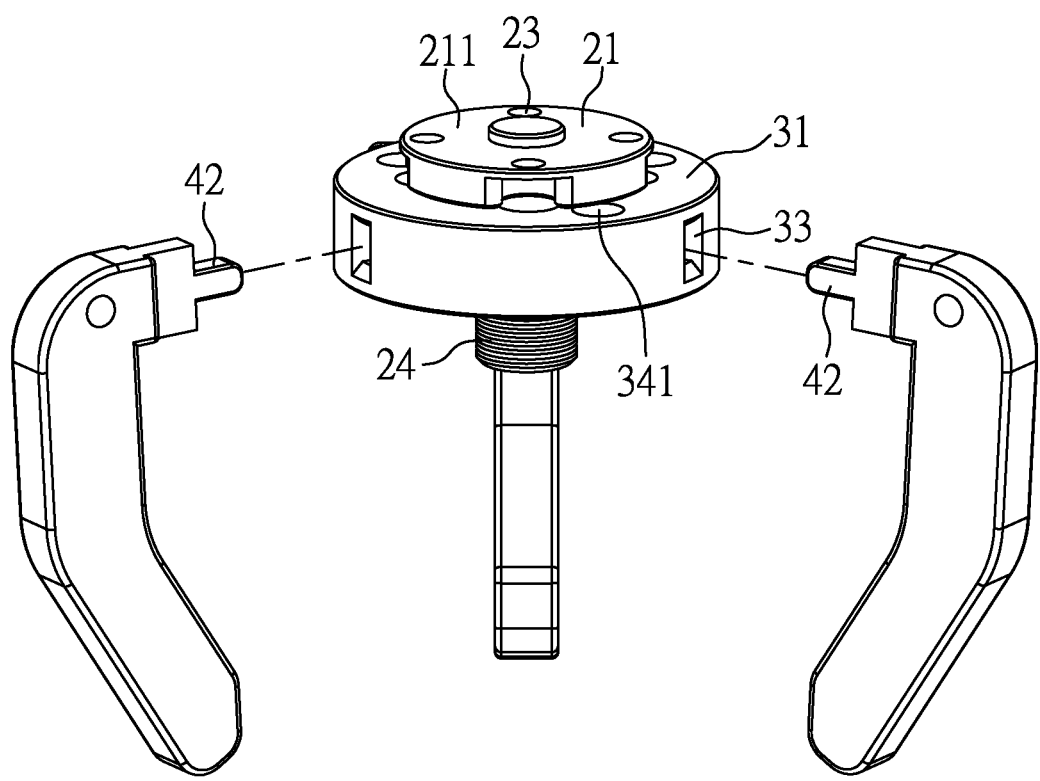
FIG. 19 is another partial perspective view showing the self-propelled gripper of the second embodiment of the present invention.
Figure 20:
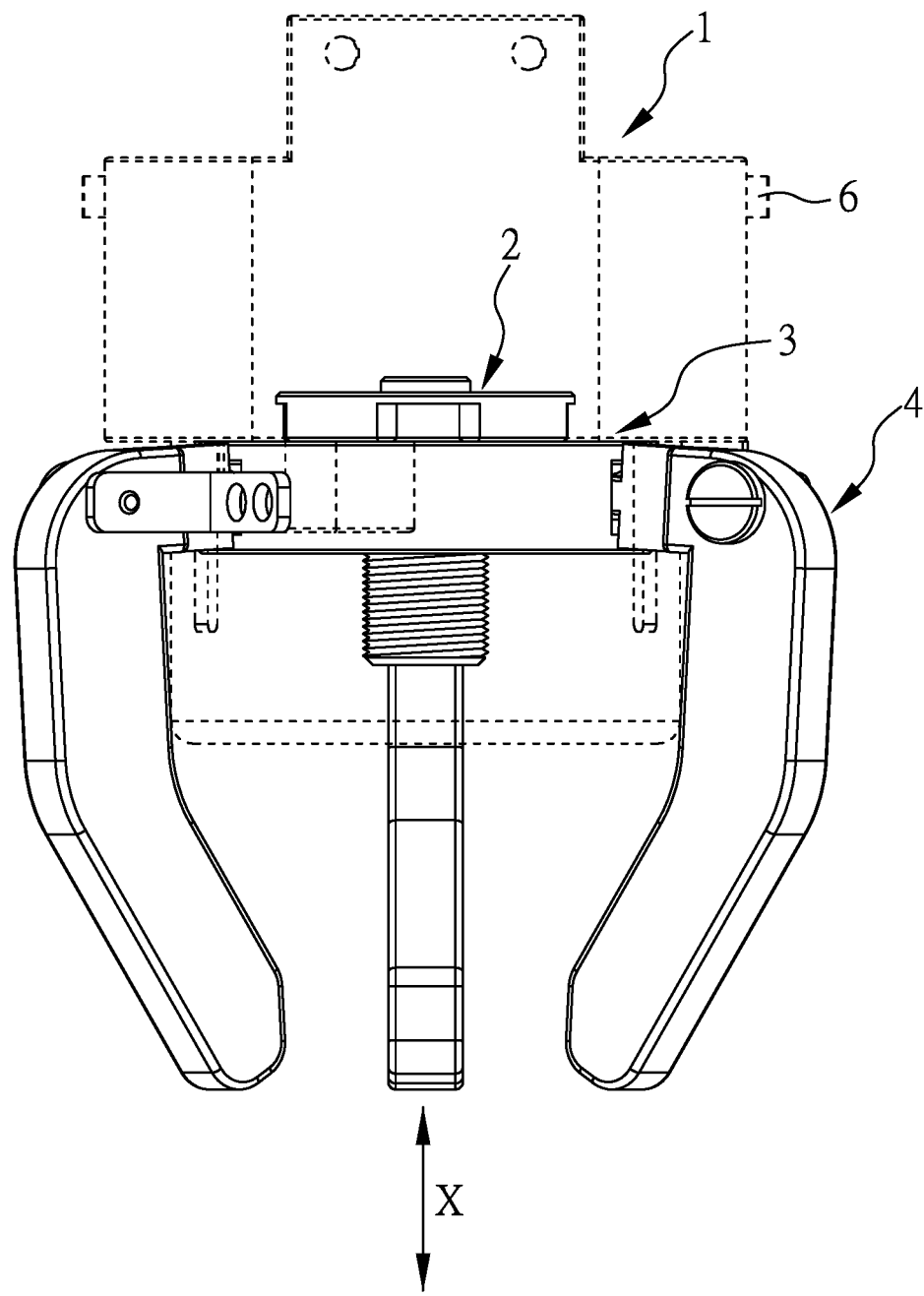
FIG. 20 is a perspective view showing the self-propelled gripper of the second embodiment of the present invention at a retracted position.
Figure 21:
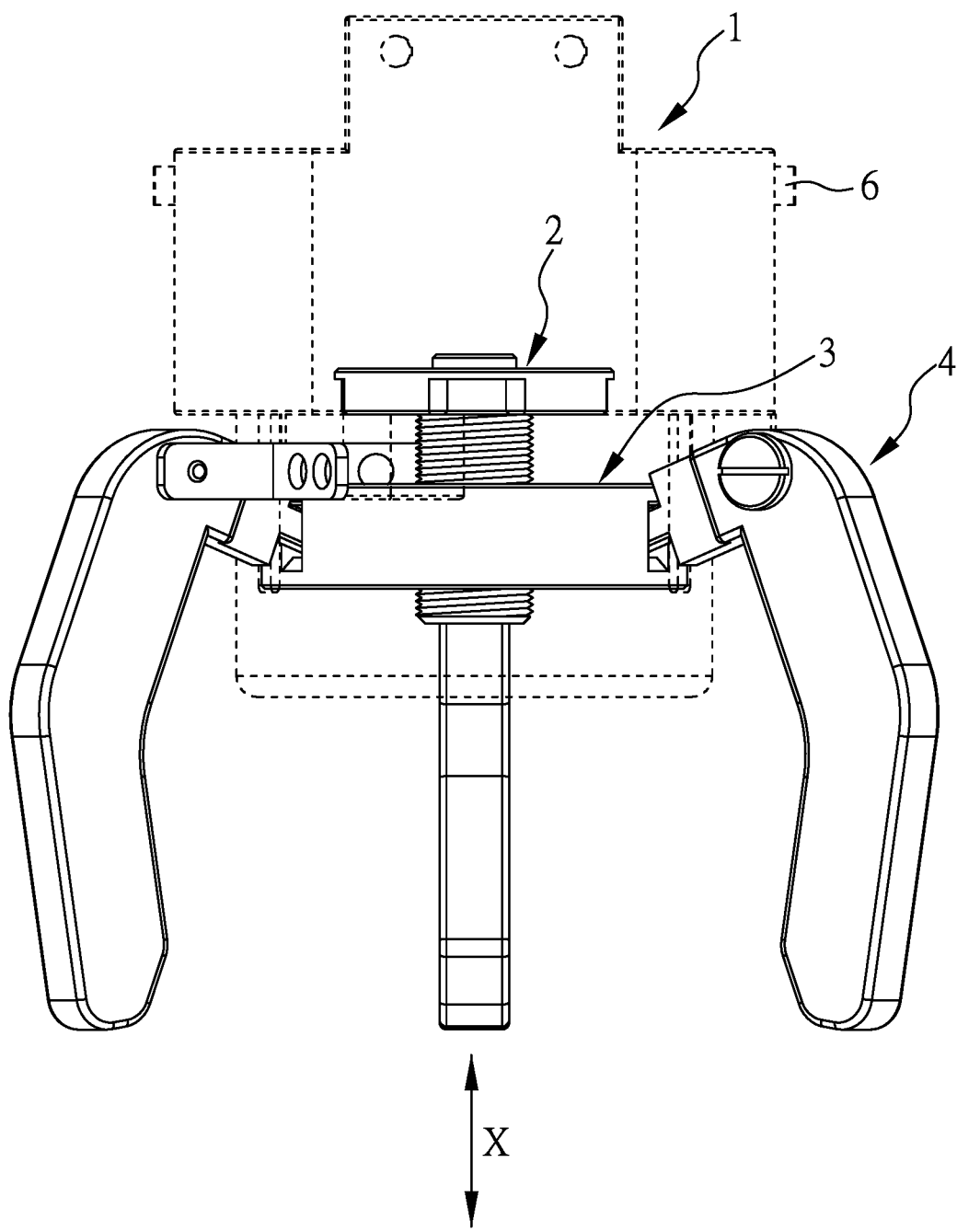
FIG. 21 is a perspective view showing the self-propelled gripper of the second embodiment of the present invention at a stretched position.

FIG. 18 and FIG. 19 show the connection among the claw bodies 4, the housing 1, and the moving element 3. Similar to the first embodiment, each of the claw bodies 4 is also pivoted to the housing 1 with each of the hinge elements 41, and the corresponding protrusion 42 of the corresponding claw body 4 abuts against the corresponding slot wall 332 of the corresponding slot 33 of the moving element 3. However, in the present embodiment, the pivot holes 16 are formed on the wing plates 1721 and are corresponding to the pivot elements 41. The pivot elements 41 are corresponding to the pivot holes 16 and are disposed on the wing plates 1721 of the front housing body 17. The claw bodies 4 may pivot relative to the housing 1. FIG. 20 and FIG. 21 respectively show the moving element 3 of the self-propelled gripper 1000 at two positions. FIG. 20 shows that the moving element 3 is located at the first position, and the claw bodies 4 are at the retracted position. FIG. 21 shows that the moving element 3 is located at the second position, and the claw bodies 4 are at the stretched position.

In another embodiment, the first transmission structure 25 and the second transmission structure 39 match with each other and integrally form a ball screw mechanism. With the ball screw mechanism, the self-propelled gripper 1000 may constrain the moving element 3 not to rotate relative to the housing 1 without being installed with the guiding structure. Therefore, the first guiding structure 13 of the housing 1 and the second guiding structure 34 of the moving element 3 can be omitted. In more detail, the first transmission structure 25 is a screw rod. The second transmission structure 39 has a plurality of balls and a nut. The nut has an internal curved pipe, and the balls are received in the internal curved pipe. When the rotation element 2 rotates, the first transmission structure 25, i.e. the screw rod, drives the second transmission structure 39, i.e. the balls and the nut. The balls roll in the internal curved pipe and drive the nut to move. Therefore, the moving element 3 would move adjacent to or away from the flange face 2021 along the rotation central line X.

In summary, the housing and the moving element of the self-propelled gripper of the present invention are respectively secured to the body and the tip axis of the robotic arm. One of the operable degrees of freedom of the robotic arm is transformed into the switch to control the gripper to stretch or retract. The cost and the complicated process of the arrangement of the extra power sources can be omitted. The operation of the robotic arm and the gripper can be controlled by one controller, and the operation is facilitated.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A self-propelled gripper, being installed on a robotic arm, the robotic arm comprising a body and a tip axis, the tip axis including a flange face and at least one locking hole, the at least one locking hole being formed on the flange face, and a rotation central line being defined by the flange face, the self-propelled gripper comprising:
    a housing, being fixed to the body and including a guiding rod extending along and coinciding with the rotation central line;
    a rotation element, being disposed in the housing, including a connecting surface being fixed to the flange face;
    a moving element, being movably disposed in the housing and connected to the rotation element, the moving element including at least one slot and a guiding hole extending along and coinciding with the rotation central line, the guiding rod and the guiding hole respectively having a non-circular cross-section corresponding to each other so that the guiding rod and the guiding hole are assembled with each other and the moving element is constrained to move along the rotation central line; and
    at least one claw body, being pivoted on the housing and partially extending into the at least one slot correspondingly;
    wherein when the rotation element rotates along with the tip axis, the rotation element drives the moving element to process a linear motion along the rotation central line so that the at least one claw body pivotally rotates on the housing, and wherein when the rotation element rotates along with the flange face, the guiding rod guides the moving element only process the linear motion along the rotation central line relative to the housing.

2. The self-propelled gripper as claimed in claim 1, wherein the rotation element further includes a first thread, the moving element further includes a second thread, and the first thread and the second thread match with each other, wherein when the rotation element rotates, the first thread rotates relative to the second thread and drives the second thread, the guiding rod and the guiding hole cooperate with each other, and the moving element moves adjacent to or away from the flange face along the rotation central line.

3. The self-propelled gripper as claimed in claim 2, wherein when the rotation element rotates in a first rotation direction, the moving element moves toward a first direction along the rotation central line, and when the rotation element rotates in a second rotation direction, the moving element moves toward a second direction along the rotation central line, and the first direction and the second direction are opposite to each other.

4. The self-propelled gripper as claimed in claim 3, wherein the guiding rod has at least one guiding rod parallel to the rotation central line, the guiding hole has at least one guiding hole parallel to the rotation central line, and the at least one guiding rod matches with the at least one guiding hole.

5. The self-propelled gripper as claimed in claim 4, wherein the rotation element further includes a shaft rod, the first thread is a set of external threads formed on the shaft rod, the moving element further includes a central through hole, the second thread is a set of internal threads formed in the central through hole, the shaft rod inserts in the central through hole, and the set of external threads matches with the set of internal threads.

6. The self-propelled gripper as claimed in claim 5, wherein the rotation element further includes a first disk body and at least one concave, the first disk body is formed with the connecting surface, which is connected to the flange face, and the at least one concave is formed on a periphery of the first disk body and corresponding to the at least one locking hole.

7. The self-propelled gripper as claimed in claim 1, wherein the first thread is a set of internal threads formed on the rotation element the second thread is a set of external threads formed on the moving element, and the set of internal threads matches with the set of external threads.

8. The self-propelled gripper as claimed in claim 7, wherein the moving element further includes a central through hole and a bearing, the central through hole and the guiding hole are intercommunicated, a cross-section of the guiding hole is smaller than a cross-section of the central through hole, and the bearing is received in the central through hole and is sleeved to the guiding rod.

9. The self-propelled gripper as claimed in claim 8, wherein the moving element further includes a circlip, an inner surface of the moving element is formed with a groove, and the circlip is disposed in the central through hole and clips in the groove to position the bearing.

10. The self-propelled gripper as claimed in claim 1, wherein the rotation element further includes a first thread, the moving element further includes a second thread, and the first thread and the second thread match with each other to integrally form a ball screw mechanism, wherein when the rotation element rotates, the first thread rotates relative to the second thread and drives the second thread, and the moving element moves adjacent to or away from the flange face along the rotation central line.

11. The self-propelled gripper as claimed in claim 1, wherein when the rotation element rotates along with the tip axis, the moving element processes the linear motion between a first position and a second position along the rotation central line so that the at least one claw body correspondingly switches between a retracted position and a stretched position.

12. The self-propelled gripper as claimed in claim 11, further comprising at least one first securing element, wherein the rotation element includes at least one first securing hole, and the at least one first securing element penetrates through the at least one first securing hole and is fixed to the tip axis so that the connecting surface of the rotation element is fixed to the flange face of the tip axis.

13. The self-propelled gripper as claimed in claim 12, wherein the at least one claw body includes a protrusion, the protrusion has a curved surface, the at least one slot has a recessed space and a slot wall, and the protrusion of the at least one claw body inserts in the recessed space and abuts against the slot wall.

14. The self-propelled gripper as claimed in claim 13, wherein the housing includes at least one through slot, and the protrusion of the at least one claw body passes through the at least one through slot and inserts in the at least one slot.

15. The self-propelled gripper as claimed in claim 14, wherein the at least one claw body further includes a hinge element, and the at least one claw body is rotatably connected to the housing by the hinge element.

16. The self-propelled gripper as claimed in claim 15, wherein the housing includes at least one first through hole, and the moving element includes at least one second through hole, wherein when the flange face is located at an initial angle, the at least one first through hole and the at least one second through hole are aligned, corresponding to the at least one first securing hole, and the at least one first securing element penetrates through the at least one first securing hole and secures in the at least one locking hole of the tip axis.

17. The self-propelled gripper as claimed in claim 12, further comprising at least one second securing element, wherein the housing is disposed on the body of the robotic arm by the at least one second securing element.

18. The self-propelled gripper as claimed in claim 17, wherein the housing further includes a main body and an adapter, wherein the adapter is fixed on the body of the robotic arm, and the main body is secured on the adapter.

19. The self-propelled gripper as claimed in claim 17, wherein the housing further includes at least one second securing hole, wherein the at least one second securing element penetrates through the at least one second securing hole and secures the housing to the body of the robotic arm.

* * * * *